M. R. MILLER.
FARMING IMPLEMENT.
APPLICATION FILED OCT. 13, 1916.
1,221,351.
Patented Apr. 3, 1917.
2 SHEETS—SHEET 1.
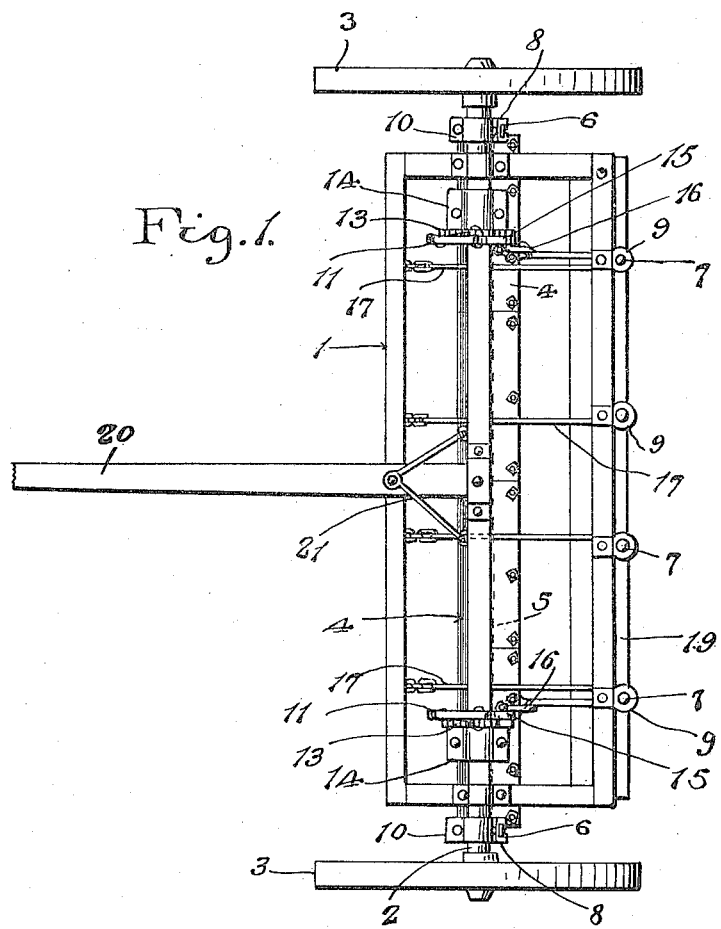
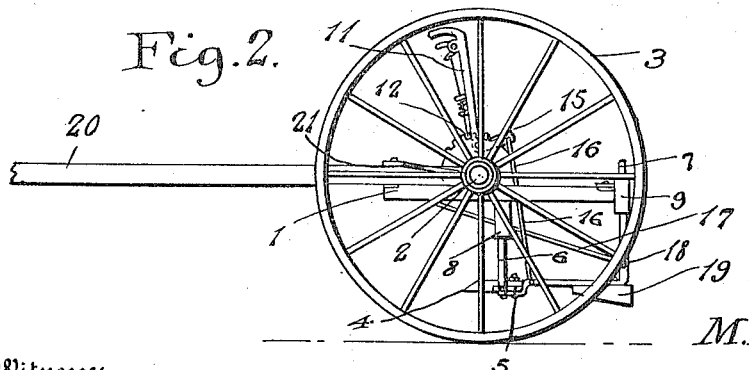
Inventor
M. R. Miller.

M. R. MILLER.
FARMING IMPLEMENT.
APPLICATION FILED OCT. 13, 1916.
1,221,351.
Patented Apr. 3, 1917.
2 SHEETS—SHEET 2.
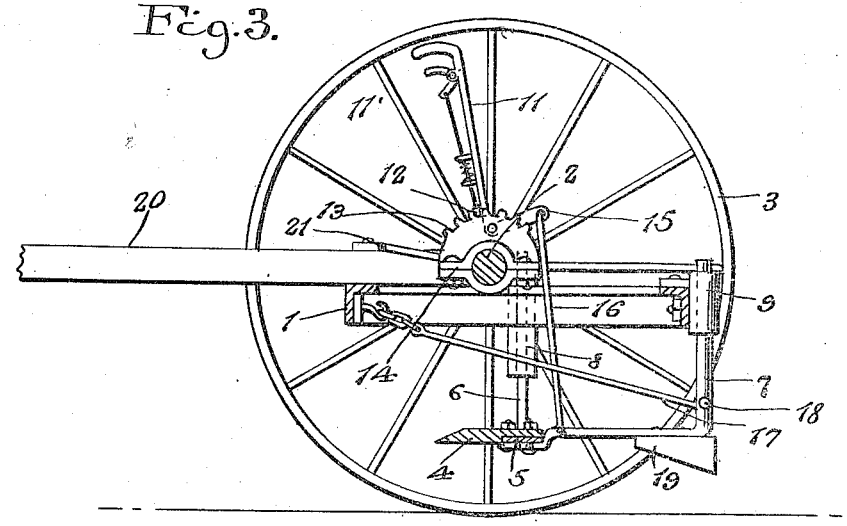
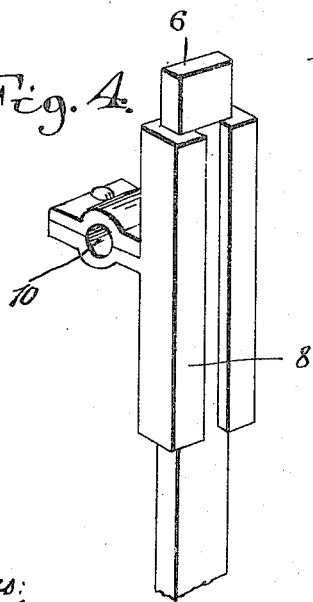
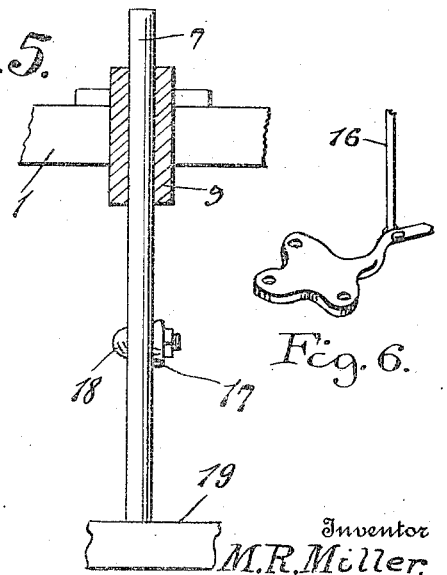
Inventor
M. R. Miller

UNITED STATES PATENT OFFICE.

MARION R. MILLER, OF CANYON, TEXAS.

FARMING IMPLEMENT.

1,221,351.         Specification of Letters Patent.         Patented Apr. 3, 1917.

Application filed October 13, 1916. Serial No. 125,381.

*To all whom it may concern:*

Be it known that I, MARION R. MILLER, a citizen of the United States, residing at Canyon, in the county of Randall and State of Texas, have invented certain new and useful Improvements in Farming Implements; and I do hereby declare the following to be a full, clear, and exact description of the invention, such as will enable others skilled in the art to which it appertains to make and use the same.

The invention relates to improvements in farming implements.

The object of the present invention is to improve the construction of farming implements and to provide a simple, practical and comparatively inexpensive farming implement of strong and durable construction adapted to remove the weeds without turning over the soil or permitting the moisture thereof to escape.

A further object of the invention is to provide a farming implement of this character equipped with a weed cutting knife and provided also with a packing or pressure bar which will engage the soil back of the knife or cutter and hold the soil in place and permit the severed weeds to pass over it.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawings

Figure 1 is a plan view of a farming implement constructed in accordance with this invention, Fig. 2 is an end elevation of the same, Fig. 3 is a longitudinal sectional view, of the farming implement, Fig. 4 is a detail view illustrating the construction of the end guide, Fig. 5 is a similar view illustrating the constructon of the rear guide.

Fig. 6 is a detail view of attaching plate of one of the slidable bars.

Like numerals of reference designate corresponding parts in the several figures of the drawings.

In the accompanying drawings in which is illustrated the preferred embodiment of the invention, the farming implement comprises in its construction a substantially oblong frame 1 constructed of suitable material preferably malleable iron and composed of front and rear bars and connecting end bars which are suitably secured intermediate of their ends to an axle 2. The axle 2 which is preferably constructed of solid round metal has carrying wheels 3 mounted upon its spindle portions and suitably secured to the same.

The implement is equipped with a knife or cutter 4 consisting of a series of separate sections bolted or otherwise secured to a transverse bar or beam 5 and adapted to be readily removed for sharpening or for any other purpose.

The transverse bar or beam preferably consists of a casting and it constitutes a support for the knife sections and is adapted to be raised and lowered by the means hereinafter described to lift the knife from the soil and to place the knife at the surface of the ground for cutting the weeds as the machine travels forwardly. Secured to the casting are upwardly extending slides or bars 6 and 7 located at the ends of the casting and at points intermediate of the ends thereof and suitably secured to the same preferably at the bottom of the said casting. The upwardly extending slides or bars operate in end and rear guides 8 and 9 located at the ends of the frame and at the rear transverse bar thereof as clearly illustrated in Fig. 1 of the drawings. The end guides are preferably rectangular in cross section to receive the end slides which preferably consist of flat bars. The rear guides are tubular and the rear vertical guides are preferably round but they may be of any other desired configuration as will be readily understood. The end guides are equipped with clamps 10 for engaging the axle and the rear guides are preferably provided with attaching flanges or portions which are bolted or otherwise secured to the rear bar of the frame. The knife or cutter which is located at the surface of the ground is raised and lowered by means of levers 11 pivotally mounted on and carrying pawls or dogs 12 for coöperating with toothed segments 13 which are provided with clamps 14 for mounting them on the axle adjacent to the ends of the frame. The levers are provided with rearwardly extending arms 15 which are connected by links or bars 16 with the knife or cutter. The pawls or dogs of the levers are adapted to engage the toothed segments for holding the knife or cutter in its adjustment.

The levers are provided with suitable handles and are preferably constructed of tubular metal, suitable latch levers of the ordinary construction being mounted adjacent to the grip or handle portions of the operating levers for controlling the pawls or dogs.

The knife or cutter is also connected with the frame by a plurality of inclined draft or draw bars 17 connected at their front ends with the front transverse bar of the main frame and at their rear ends with the rear slides and adapted when the knife or cutter is in operation to take the strain from the mechanism for slidably mounting and adjustably securing the knife or cutter.

The rear end of the draft bars or draw bars 17 are preferably connected with the rear guides by pivots 18 and their front ends may have a link connection with the front transverse bar of the main frame to compensate for the arcuate swing of the said bars 17 and to enable the cutter to be moved upwardly and downwardly with a vertical movement without binding in the guides.

The machine is equipped with a sliding board or member 19 constructed of suitable metal and located in rear of the knife sections and adapted to slide on the ground and pack and hold the soil to prevent the same from being turned whereby the moisture is retained in the ground. The severed weeds cut by the knife are adapted to slide rearwardly over the board or member which is tapering in thickness from its rear to its front edge. The ground operated on by the farming implement is more or less soft in character and irregular in surface, and the cutter, which operates at the surface of the soil, will sever and loosen more or less of the same and the sliding board or member 19, which will have its rear portion pressed more or less into the soil, will operate to pack the loose soil and prevent the escape of moisture.

The machine is provided with a tongue 20 connected with the front portion of the frame and braced by rearwardly diverging rods 21 and in practice the seat for the accommodation of the driver will be mounted either upon the tongue or upon the frame.

What is claimed is:—

1. A farming implement of the class described including a frame provided at intervals at its rear portion with vertical guides, vertical guides located at the ends of the frame, a transverse cutter provided with rear and end vertical slides operating in the said guides, inclined draft bars connected with the rear slides and with the front portion of the frame, and means for raising and lowering the knife or cutter.

2. A farming machine of the class described including a wheeled frame provided with vertical guides, a transversely disposed knife arranged to operate at the surface of the ground for cutting weeds and provided with slides operating in the said guides, means for raising and lowering the knife and a slide member located in rear of the knife and tapered forwardly and adapted to pack the soil and permit the severed weeds to slide over it.

In testimony whereof I affix my signature in presence of two witnesses.

MARION R. MILLER.

Witnesses:
RECTOR L. LESTER,
PEARL JINKINS.

Copies of this patent may be obtained for five cents each, by addressing the "Commissioner of Patents, Washington, D. C."